June 9, 1925.

A. H. BATES 1,540,872

APPARATUS FOR MAKING HOLLOW RUBBER ARTICLES

Original Filed Aug. 20, 1923

Inventor

Albert H. Bates

By Bates, Macklin, Goedrick Parr

Attorneys.

Patented June 9, 1925.

1,540,872

UNITED STATES PATENT OFFICE.

ALBERT H. BATES, OF CLEVELAND HEIGHTS, OHIO, ASSIGNOR TO PARAMOUNT RUBBER CONSOLIDATED, INC., OF TUCKAHOE, NEW YORK, A CORPORATION OF DELAWARE.

APPARATUS FOR MAKING HOLLOW RUBBER ARTICLES.

Original application filed August 20, 1923, Serial No. 658,271. Divided and this application filed September 20, 1924. Serial No. 738,842.

*To all whom it may concern:*

Be it known that I, ALBERT H. BATES, a citizen of the United States, residing at Cleveland Heights, in the county of Cuyahoga and State of Ohio, have invented a certain new and useful Improvement in an Apparatus for Making Hollow Rubber Articles, of which the following is a full, clear, and exact description, reference being had to the accompanying drawings.

This invention relates to molds for use in the manufacture of hollow rubber articles and comprises a division of my copending application Serial No. 658,271, filed August 20, 1923. In my copending application, I have described an apparatus of the type wherein stock is seated pneumatically in mold cavities, thus obviating the necessity for plungers for seating the stock, and for various expedients for holding it in place.

Briefly, this apparatus includes a seating press to which multiple cavity molds are fed one after another after raw rubber sheet stock has been placed on the face of the mold. The press is then operated to bring an air chamber over the stock and mold and compressed air is admitted to seat the stock in the cavities, whereupon the mold with the rubber-lined cavities is discharged and conveyed to the proper place. Thereupon, one mold can be placed upon another, and the two placed within a hydraulic press to join the seated stock and to shear off the surplus material.

The present invention, as heretofore stated, is particularly concerned with the mold and has for one of its objects, the attainment of a mold which functions to permit the retaining of the stock pneumatically seated therein, after the mold is released from the press, yet permits the seated stock to be readily removed from the individual cavities whenever desired.

The preferred means for carrying out my invention is hereinafter more fully explained in connection with the accompanying drawings which show one embodiment, while the essential features will be summarized in the claims.

Figure 1:
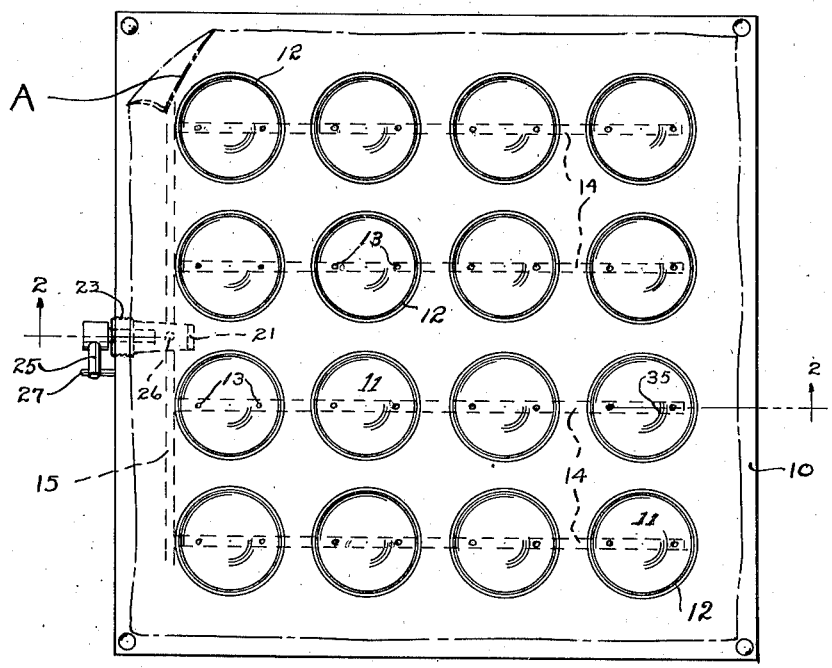
Figure 2:
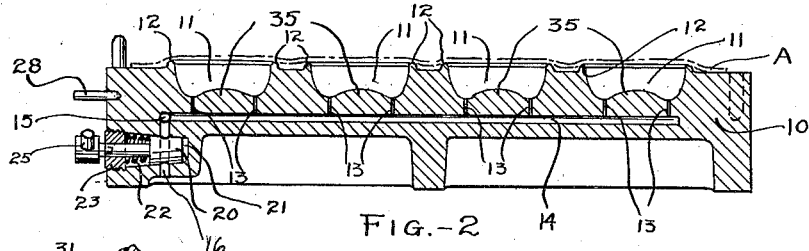
Figure 3:
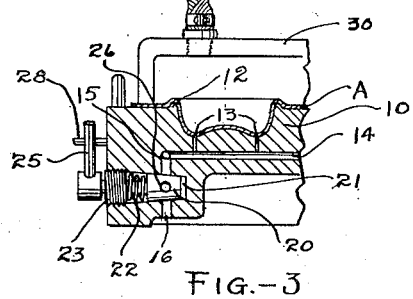
Figure 4:
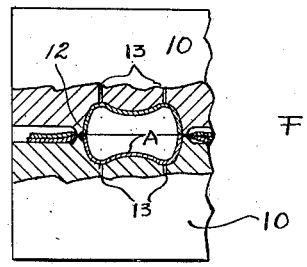

In the drawings, Fig. 1 is a plan view of one of the molds showing a sheet of the plastic stock lying thereon; Fig. 2 is a cross section through such mold taken on the line 2—2 in Fig. 1; Fig. 3 is a sectional detail illustrating diagrammatically a portion of a press employed for pneumatically seating the stock in the mold cavities; and Fig. 4 is a side elevation, partly in section showing cooperating portions of two of the mold members as forced together to join the stock.

I have shown my invention in connection with a mold section, comprising a block 10 having, in its upper portion, a series of outwardly facing cavities 11 each surrounded by an annular raised cutting edge 12. Each cavity is provided with one or more vents 13 which lead downwardly to transverse passageways 14 which are common to a row of cavities. These transverse passageways terminate in a header passageway 15. A single valve 20 in a downward outwardly opening branch 16 of the header passageway, may thus control the vents for all of the cavities.

The preferred construction of the valve 20, embodies a quarter-turn type of plug, which is seated in a cavity 21 in the mold base, and is pressed to its seat by a spring 22 which bears against a suitable collar 23. This collar may be in threaded engagement with the mold, and may embrace the shank of the plug. A suitable handle 25 may be employed for actuating the valve. The plug may have a diametric passageway 26 whereby when the handle is in the "down" or in the substantially horizontal position shown in Fig. 2, the vents are all open. When the handle is nearly vertical, as shown in Fig. 4, then the vents are all closed. Suitable stops, as for example pins 27 and 28 may be used for limiting the movement of the handle.

In Fig. 1, a sheet of rubber is indicated by the broken lines A, as lying across all of the cavities. The apparatus set forth in my copending application heretofore referred to, clamps the sheet about the margin and subjects the interior region to an air pressure above that of the atmosphere while the valve 20 is open. A portion of the clamping device is indicated at 30 in Fig. 4, while a conduit 31 through which compressed air may be conveyed to the clamping member is indicated as attached to the member 30. When the air under pressure is admitted into the member 30, the rubber is caused to be seated within the cavities, as indicated in Fig. 4. Then if the valve 20 is closed, the rubber will remain in the seated position indefinitely, after the air pressure is removed. Accordingly, if two of the molds with their cavities lined with rubber, are placed one upon the other and pressed together, then the annular edges 12 operate to form an effective seam, and at the same time to cut off the surplus stock, as indicated in Fig. 4.

The cavities illustrated in the drawings, have humps 35 in their lower portions which form inward bends in the biscuit which become outward bulges in vulcanization. This feature reduces the necessary depth of the cavity, provides a more uniform wall of biscuit and also functions to relieve the internal pressure, caused by the reduction of cubical content of the hollow biscuit after the air is first entrapped therein. The reduction of volume and corresponding increase in pressure results from the fact that the molds are brought together a distance substantially equal to two thicknesses of rubber after the two sheets of rubber on the cooperating mold members have touched and confined the air. This feature however, is no part of the present invention, and, so far as the present application is concerned, may be employed or omitted as desired.

The mold made in accordance with my invention and as illustrated in the drawings, is adapted for making hollow rubber articles such as balls, but it is to be understood that the mold is equally adaptable for hollow rubber articles of other form and material.

An advantage of the mold however, is the fact that the stock may be seated under pneumatic pressure and thereafter retained within the mold cavities at will for an indefinite period. This permits the rubber lining of the mold cavities at a very rapid speed entirely independently of the machine which effects the junction of the biscuits. Moreover the molds may be roughly handled without danger of unseating the stock during or preliminary to the joining operation.

Having described my invention, I claim :—

1. In an apparatus for making hollow articles of plastic material, a cavitary mold having a vent, and a valve carried by the mold for said vent, and having means whereby it may be opened.

2. In an apparatus for making hollow articles of plastic material, a mold having a cavity surrounded by a raised cutting edge and having a vent, and a valve carried by the mold for said vent, and having means whereby it may be opened.

3. In an apparatus for making hollow articles of plastic material, the combination of a mold having a set of cavities, vents leading therefrom to a common discharge, and a valve carried by the mold controlling the discharge and provided with means whereby the valve may be opened.

4. In an apparatus for making hollow articles of plastic material, the combination of a mold having a set of cavities, vents leading therefrom to a common discharge, a rotary plug valve carried by the mold controlling the discharge and an external handle on the valve whereby it may be opened.

5. In an apparatus for making hollow articles of plastic material, the combination of a mold having a set of cavities each provided with a surrounding raised edge, vents leading from the respective cavities to a common discharge, a valve carried by the mold controlling the discharge and adapted to stand in either open or closed position, and external means whereby the valve may be opened.

6. In an apparatus for making hollow articles of plastic material, a mold having a cavity, a vent leading therefrom, a valve carried by the mold controlling the vent, said valve having an external handle by which it may be opened or closed.

7. In an apparatus for making hollow articles of plastic material, the combination of a mold having a plurality of rows of cavities, passageways associated with the respective rows, a header passageway communicating with the passageways mentioned and having a discharge opening, a valve carried by the mold controlling the discharge and adapted to stand in either open or closed position, and external means whereby the valve may be opened.

In testimony whereof, I hereunto affix my signature.

ALBERT H. BATES.